(12) United States Patent
Shirakura et al.

(10) Patent No.: US 8,773,653 B2
(45) Date of Patent: Jul. 8, 2014

(54) ATTITUDE CORRECTION APPARATUS INCLUDING OPPOSING LASER EMITTERS

(75) Inventors: Eiichi Shirakura, Aikoh-gun (JP); Koji Sotokawa, Aikoh-gun (JP); Shinpei Kakiuchi, Aikoh-gun (JP)

(73) Assignee: NHK Spring Co., Ltd., Kanagawa (JP)

( * ) Notice: Subject to any disclaimer, the term of this patent is extended or adjusted under 35 U.S.C. 154(b) by 253 days.

(21) Appl. No.: 13/451,082

(22) Filed: Apr. 19, 2012

(65) Prior Publication Data

US 2012/0287421 A1 Nov. 15, 2012

(30) Foreign Application Priority Data

May 11, 2011 (JP) .................................. 2011-106358

(51) Int. Cl.
*G01B 11/26* (2006.01)
*G11B 21/21* (2006.01)
*G11B 11/26* (2006.01)
*G01C 15/00* (2006.01)

(52) U.S. Cl.
CPC ................ *G11B 21/21* (2013.01); *G11B 11/26* (2013.01); *G01C 15/004* (2013.01); *G01C 15/002* (2013.01)
USPC ......................... 356/138; 356/614; 356/139.03

(58) Field of Classification Search
CPC ...... G11B 21/21; G01B 11/26; G01B 11/272; G01B 11/27; G01C 15/004; G01C 15/002
USPC ....................... 356/138, 614, 139.03
See application file for complete search history.

(56) References Cited

U.S. PATENT DOCUMENTS

| 6,175,440 B1 * | 1/2001 | Conemac ................... 359/204.1 |
| 6,347,103 B1 * | 2/2002 | Song et al. ....................... 372/36 |
| 7,196,849 B2 * | 3/2007 | McGuire et al. ............... 359/630 |
| 7,545,519 B2 * | 6/2009 | Ossman et al. ................ 356/625 |

FOREIGN PATENT DOCUMENTS

JP 2007-066427 3/2007

* cited by examiner

*Primary Examiner* — Tarifur Chowdhury
*Assistant Examiner* — Isiaka Akanbi
(74) *Attorney, Agent, or Firm* — Jordan and Hamburg LLP

(57) ABSTRACT

An attitude correction apparatus includes a pair of opposing laser emitters that face each other. Each of the laser emitters includes a laser oscillator to generate a laser beam, a condenser lens to emit the laser beam toward the head suspension, and galvanomirrors to adjust the directivity of an optical axis of the laser beam from a standby state toward a spot on the head suspension. The condenser lens of each laser emitter is positioned so that the directivity of the optical axis of the laser beam in the standby state disagrees with an optical path that passes through the condenser lens and laser oscillator of the other laser emitter.

8 Claims, 6 Drawing Sheets

ATTITUDE CORRECTION APPARATUS INCLUDING OPPOSING LASER EMITTERS

BACKGROUND OF THE INVENTION

1. Field of the Invention

The present invention relates to an attitude correction apparatus including opposing laser emitters for correcting the attitude of an object such as a head suspension installed in a hard disk drive.

2. Description of Related Art

Recent hard disk drives employ hard disks of very high recording density, and due to this, a head suspension that supports a magnetic head to read/write the hard disk in the hard disk drive is required to be highly precise. The magnetic head attached to the head suspension floats from the hard disk by a predetermined distance when the hard disk is driven at high speed and the attitude of the floating magnetic head is greatly influenced by a minute difference in attitude angles such as roll and pitch angles of the head suspension.

Accordingly, attitude angles of every head suspension must be corrected with the use of an attitude correction apparatus in a manufacturing line.

An example of the attitude correction apparatus is disclosed in Japanese Unexamined Patent Application Publication No. 2007-66427. This related art emits a laser beam to a correction object, i.e., a head suspension to thermally deform the laser-irradiated part and correct the attitude of the head suspension.

This related art arranges a pair of laser emitters on each side of a head suspension and emits laser beams from the laser emitters to each side of the head suspension, thereby correcting the attitude of the head suspension. This technique is capable of shortening an attitude correction time, increasing an attitude correction amount, and improving an attitude correction accuracy.

The related art, however, has a problem that, if one of the laser emitters accidentally emits a laser beam in a standby state into the other laser emitter, an optical isolator, a light source, and the like arranged in the other laser emitter are damaged. If the laser emitters are fiber lasers that achieve high gain, the laser emitter that accidentally receives a laser beam from the other intensifies the received laser beam and the optical isolator, light source, and the like thereof are severely damaged.

SUMMARY OF THE INVENTION

An object of the present invention is to provide an attitude correction apparatus including opposing laser emitters and is capable of preventing the laser emitters from being damaged with a laser beam accidentally emitted from the opposing laser emitter.

In order to accomplish the object, an aspect of the present invention provides an attitude correction apparatus including a correction unit having a pair of opposing laser emitters that face each other on each side of a correction object and emit laser beams toward spots on each side of the correction object to correct an attitude of the correction object according to the spots irradiated with the laser beams. Each of the laser emitters includes a light source that generates a laser beam, an emission part that emits the laser beam toward the correction object, and an adjustment part that adjusts a directivity of an optical axis of the laser beam from a directivity of a standby state toward a spot on the correction object. The emission part of each of the laser emitters is positioned so that the optical axis of the laser beam in the standby state disagrees with an optical path that passes through the emission part and light source of the other laser emitter.

Although the pair of laser emitters face each other, this aspect of the present invention is capable of preventing a laser beam emitted from one of the laser emitters from reaching the light source of the other laser emitter, thereby protecting an optical system including the light source of the other laser emitter from being damaged.

DETAILED DESCRIPTION OF EMBODIMENTS

Embodiments of the present invention will be explained with reference to the drawings. Each embodiment provides an attitude correction apparatus including a pair of opposing laser emitters that face each other and preventing a laser beam emitted from one of the laser emitters from damaging an optical system of the other. For this, each embodiment displaces an optical axis of laser beam in each laser emitter in a standby state from an optical path passing through the emission part and the light source of the other laser emitter. In the standby state, the optical axes of laser beam in the laser emitters extend along a first direction and are spaced apart from each other in a second direction that is orthogonal to the first direction.

An attitude correction apparatus including opposing laser emitters according to a first embodiment of the present invention will be explained in detail.

Figure 1:
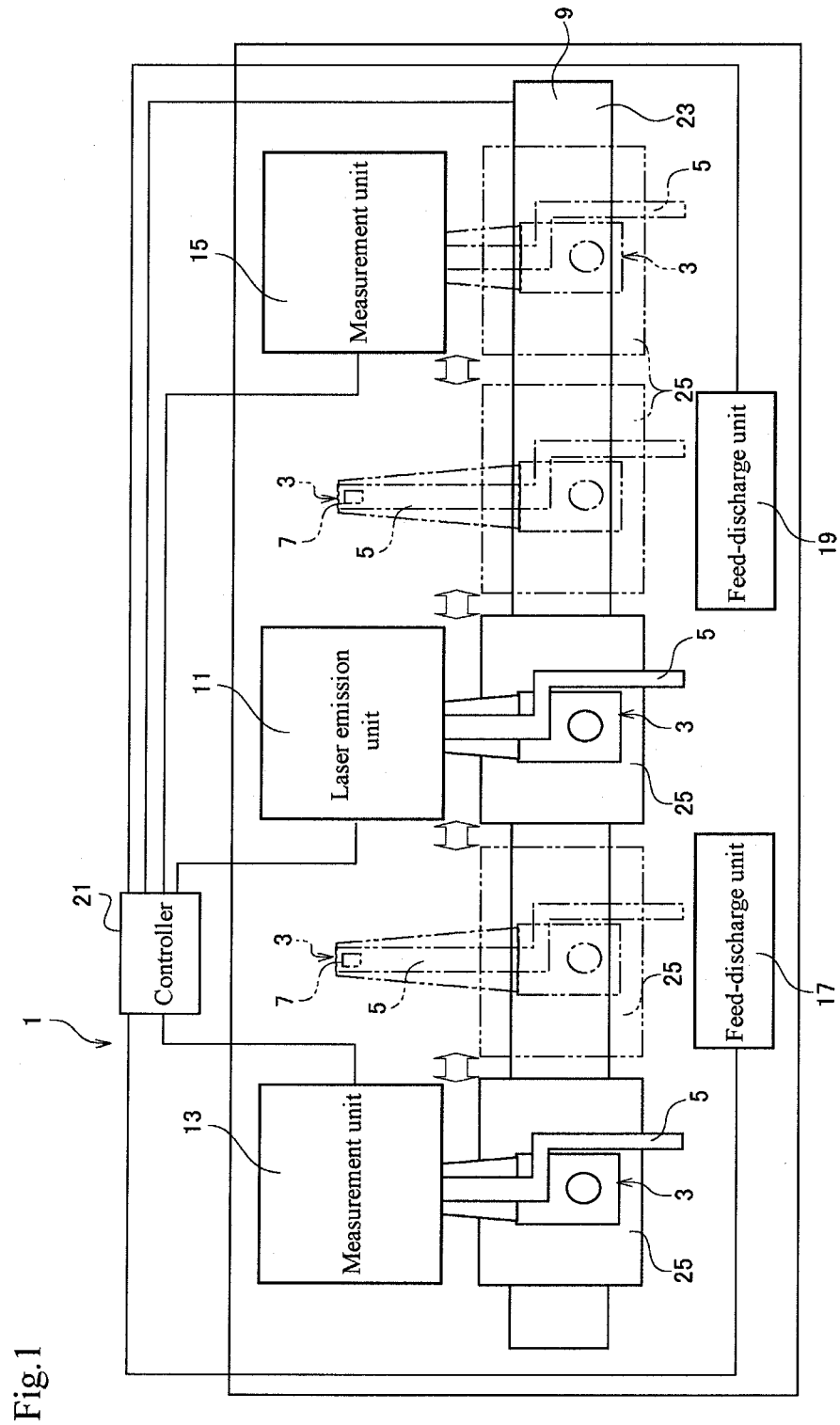
FIG. 1 is a view schematically illustrating an attitude correction apparatus according to a first embodiment of the present invention.

FIG. 1 is a view schematically illustrating the attitude correction apparatus 1 according to the first embodiment. The attitude correction apparatus 1 corrects a static attitude of a correction object, which is a head suspension 3 according to the first embodiment, by irradiating the head suspension 3 with laser beams. The attitude correction apparatus 1 emits laser beams to a head portion 7 of a flexure 5 attached to the head suspension 3 and thermally deforms the head portion 7 with the laser beams, thereby correcting attitude angles such as pitch and roll angles of the head portion 7. The head portion 7 is provided with a magnetic head, and the head portion 7 includes the part being provided with the magnetic head and the peripheral thereof. The attitude correction of the head portion 7 is carried out before or after attaching the magnetic head thereto.

The attitude correction apparatus 1 includes a convey unit 9, a laser emission unit 11, measurement units 13 and 15, feed-discharge units 17 and 19, and a controller 21.

The convey unit 9 has a jig 25 that is moved along a convey line 23. The jig 25 supports the head suspension 3 and the convey unit 9 moves the jig 25 between the measurement unit 13 (15) and the laser emission unit 11.

Namely, the head suspension 3 supported with the jig 25 is moved along the convey line 23 from the measurement unit 13 (15) to the laser emission unit 11 and is retracted from the laser emission unit 11 to the measurement unit 13 (15).

According to the embodiment, the movements of the head suspensions 3 are alternately carried out between the measurement units 13 and 15 and the laser emission unit 11, so that one of the head suspension 3 is fed from the corresponding measurement unit 13 or 15 to the laser emission unit 11 and the other of the head suspension 3 is retracted from the laser emission unit 11 to the corresponding measurement unit 15 or 13.

The measurement units 13 and 15 each are a measurement unit such as a collimator and are arranged on each side of the laser emission unit 11. The measurement unit 13 (15) measures pitch and roll angles of the head portion 7 of the head suspension 3 and transfers a result of the measurement to the controller 21. The attitude angle measurement by the measurement unit 13 (15) is carried out before and after attitude correction of the head portion 7.

The laser emission unit 11 emits laser beams from the top and bottom sides of the head suspension 3. The details of the laser emission unit 11 will be explained later.

The feed-discharge unit 17 (19) is arranged between the measurement unit 13 (15) and the laser emission unit 11. The feed-discharge unit 17 (19) feeds a head suspension 3 before attitude correction to the jig 25 of the convey unit 9 and picks up the head suspension 3 after attitude correction from the jig 25.

The controller 21 is an information processing device such as a computer. The controller 21 controls the convey unit 9, measurement units 13 and 15, and feed-discharge units 17 and 19, as well as laser emission of the laser emission unit 11 according to measurement results from the measurement units 13 and 15.

According to the pitch and roll angles of the head portion 7 measured with the measurement unit 13 (15), the controller 21 controls the laser emission unit 11 so that laser beams are emitted to irradiation spots on the head portion 7. The irradiation spots are obtained from, for example, a correction table that indicates a relationship between spots on the head portion 7 and the pitch and roll angles (or correction amounts thereof) of the head portion 7. The correction table is prepared in advance from a plurality of head suspension samples.

Figure 2:
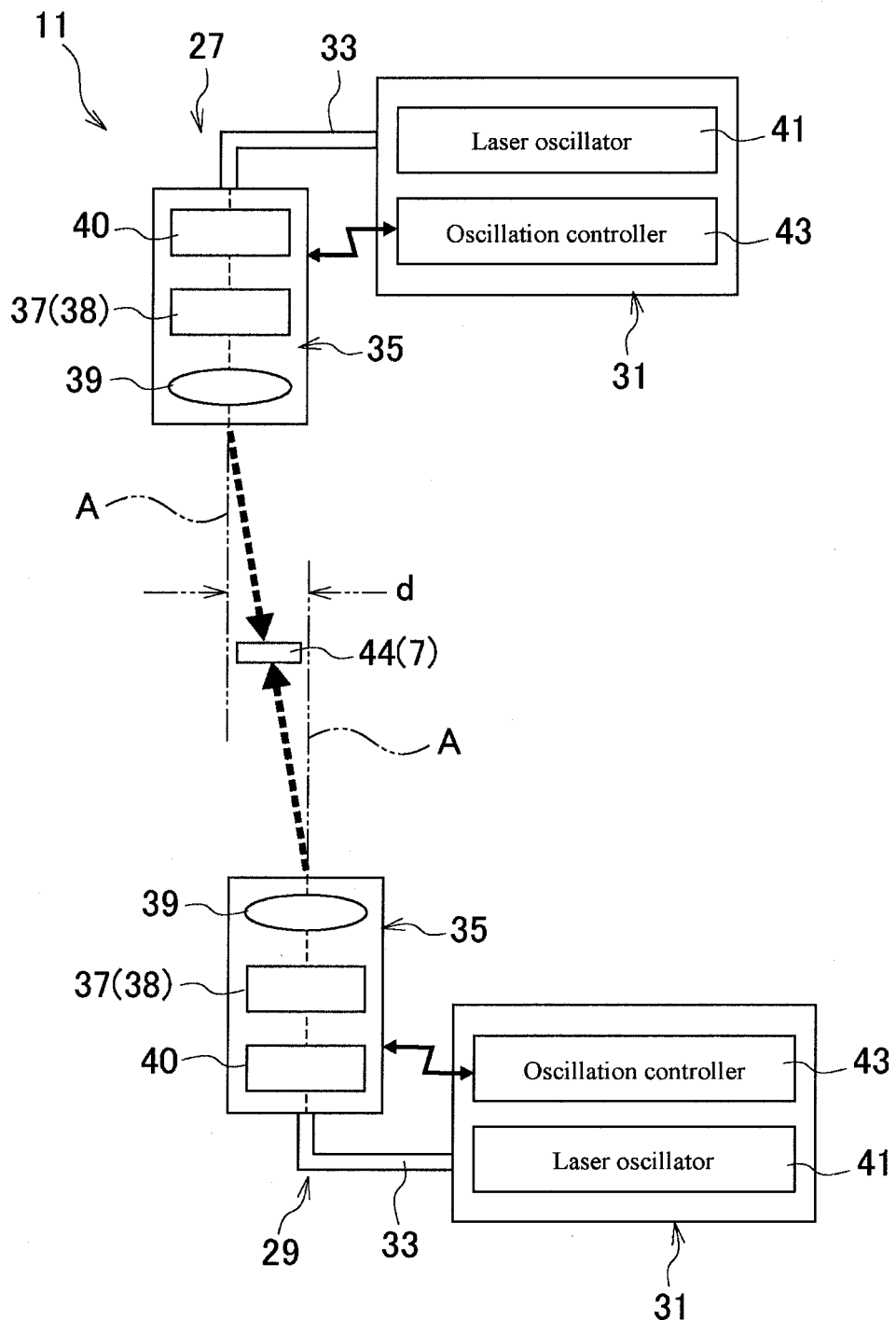
FIG. 2 is a view schematically illustrating a laser emission unit in the attitude correction apparatus of FIG. 1.
Figure 3:
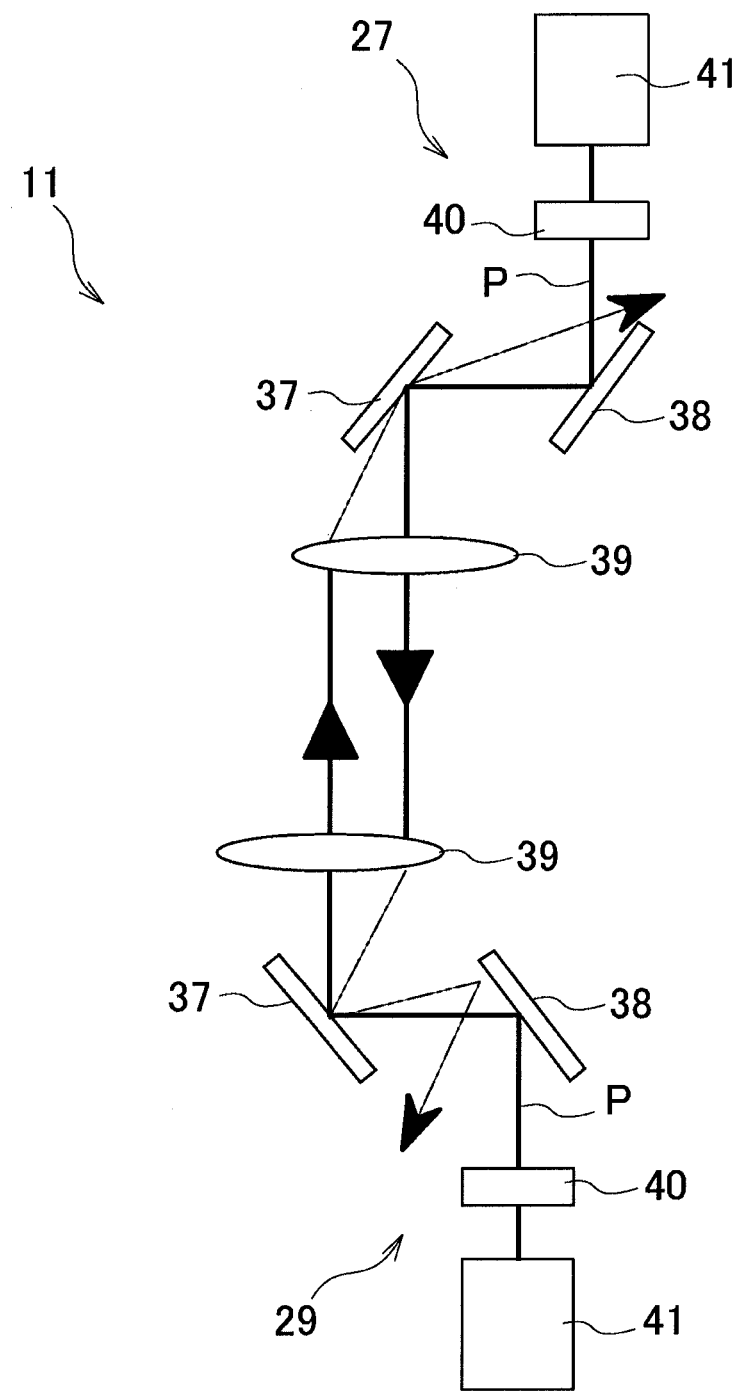
FIG. 3 is a view illustrating main parts of the laser emission unit of FIG. 2.

The details of the laser emission unit 11 will be explained in detail. FIG. 2 is a view schematically illustrating the laser emission unit 11 and FIG. 3 is a view illustrating main parts of the laser emission unit 11.

The laser emission unit 11 is a correction unit having a pair of emitters 27 and 29. The laser emitters 27 and 29 are vertically arranged to face each other on the upper and lower sides of the head portion 7 of the flexure 5 attached to the head suspension 3, so that the laser emitters 27 and 29 emit laser beams to the upper and lower sides of the head portion 7, respectively.

The laser emitters 27 and 29 are, for example, laser markers having same components. The laser emitter 27 (29) includes a marker body 31 connected to a marker head 35 through a light guide 33 such as an optical fiber. The marker body 31 generates a laser beam, which is transmitted to the marker head 35 through the light guide 33. The marker head 35 emits the laser beam toward the head portion 7 of the head suspension 3.

The marker head 35 has an image pickup (not illustrated) such as a camera to pick up an image of the head portion 7 and a periphery thereof when emitting a laser beam. The image pickup may separately be arranged between the laser emission unit 11 and each of the measurement units 13 and 15.

The marker body 31 includes a laser oscillator 41 corresponding to the "light source" stipulated in the claims and an oscillation controller 43. The laser oscillator 41 excites an oscillation medium such as YAG with a flash lamp, a laser diode, or the like and generates a laser beam.

The oscillation controller 43 synchronizes the laser oscillation by the laser oscillator 41 with the operation of galvanomirrors 37 and 38.

The marker head 35 includes the pair of galvanomirrors 37 and 38 as adjustment parts, a condenser lens 39 as an emission part, and an optical isolator 40.

The galvanomirrors 37 and 38 reflect and deflect the laser beam sent from the marker body 31 toward the condenser lens 39. A reflection direction of the galvanomirrors 37 and 38 with respect to the condenser lens 39 is adjusted by 2-axis (XY-axis) control.

The condenser lens 39 properly adjusts an energy density distribution of the laser beam from the galvanomirrors 37 and 38 and emits the adjusted laser beam toward the head portion 7 of the head suspension 3.

The directivity of an optical axis of the laser beam from the condenser lens 39 is vertical in a standby state in which no attitude correction is carried out. On the other hand, in an attitude correction state to correct the attitude of the head suspension 3, the directivity is changed from the standby state, and an irradiation spot on the head portion 7 of the head suspension 3 is controlled by the galvanomirrors 37 and 38.

The condenser lens 39 of the laser emitter 27 (29) has an optical axis A along which a laser beam in the standby state travels. The optical axis A disagrees with an optical path P that passes through the condenser lens 39 and laser oscillator 41 of the other laser emitter 29 (27).

According to the first embodiment, the pair of laser emitters 27 and 29 have the vertical optical axes A, having the same directivity, along which laser beams travel in the standby state, and the optical axes A are displaced from each other in a direction as a second direction orthogonal to the vertical direction as a first direction. This displacement is achieved by displacing the condenser lenses 39 of the laser emitters 27 and 29 from each other.

According to the first embodiment, a distance "d" between the optical axes A of the laser emitters 27 and 29 is about 10 mm. The amount of the distance "d" is optional and is determined according to the capacity of the laser emitters 27 and 29. The distance "d" may be larger than 10 mm if the attitude correction according to the embodiment is achievable.

Due to the distance "d" between the optical axes A of the laser emitters 27 and 29, a laser beam from the laser emitter 27 (29) that may enter the condenser lens 39 of the opposing laser emitter 29 (27) is reflected by the galvanomirrors 37 and 38 of the opposing laser emitter 29 (27) into a direction indicated with a dash-and-two-dot line that deviates from the optical path P passing through the laser oscillator 41 of the opposing laser emitter 29 (27). In this way, a laser beam from the laser emitter 27 (29) is shifted by the galvanomirrors 37 and 38 of the opposing laser emitter 29 (27) outside the optical path P of the opposing laser emitter 29 (27).

The laser emitter 27 (29) may direct a laser beam thereof to the outside of an effective diameter of the condenser lens 39 of the other laser emitter 29 (27). This is achievable by further displacing the laser emitters 27 and 29 from each other or by controlling the galvanomirrors 37 and 38 of each of the laser emitters 27 and 29.

To direct a laser beam from one of the laser emitters 27 and 29 to the outside of the other, the laser emitters 27 and 29 may be inclined with respect to each other. In this case, the galvanomirrors 37 and 38 may be omitted from the laser emitters 27 and 29 and the marker head 35 of each of the laser emitters 27 and 29 may be driven with a drive source such as a motor, to adjust a laser beam toward an irradiation spot on the head portion 7 of the head suspension 3. In this case, the drive source serves as the adjustment part.

The optical isolator 40 comprises an optical component, such as a polarization element, a rotor employing Faraday effect, or the like. The optical isolator 40 is arranged in the optical path P between the laser oscillator 41 and the condenser lens 39, to block a reflected return beam from entering the laser oscillator 41. The reflected return beam is a return component of a laser beam reflected by the surface of the head suspension 3.

Attitude correction of the head suspension 3 will be explained with reference to FIGS. 4A to 4D. A zone from the laser emission unit 11 to the measurement unit 13 is defined as a first zone and a zone from the laser emission unit 11 to the measurement unit 15 is defined as a second zone.

Figure 4A:
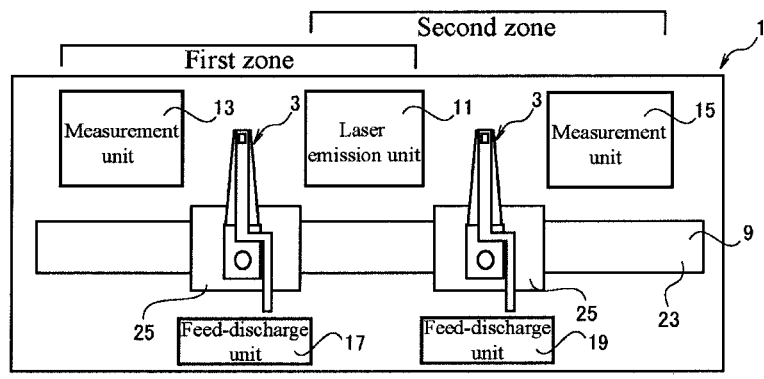
FIGS. 4A to 4D are views illustrating attitude correction of a head suspension carried out by the attitude correction apparatus of FIG. 1.

In FIG. 4A, the jig 25 on the convey line 23 in each of the first and second zones is positioned between the measurement unit 13 (15) and the laser emission unit 11.

In this state, a head suspension 3 before attitude correction is fed from the feed-discharge unit 17 (19) onto the jig 25.

Figure 4B:
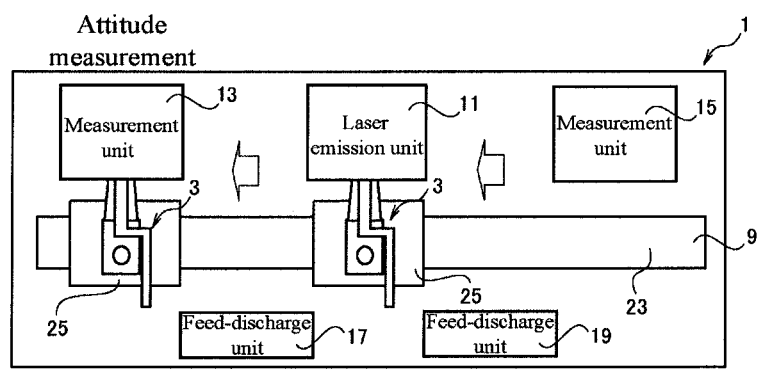

As illustrated in FIG. 4B, the convey unit 9 is driven in a first direction so that the head suspension 3 in the first zone is positioned at the measurement unit 13, which measures pitch and roll angles of the head portion 7 of the head suspension 3 before attitude correction.

At this time, the head suspension 3 in the second zone is positioned at the laser emission unit 11. However, no attitude correction is carried out on the head suspension 3 because angle measurement thereof is not carried out yet.

Figure 4C:
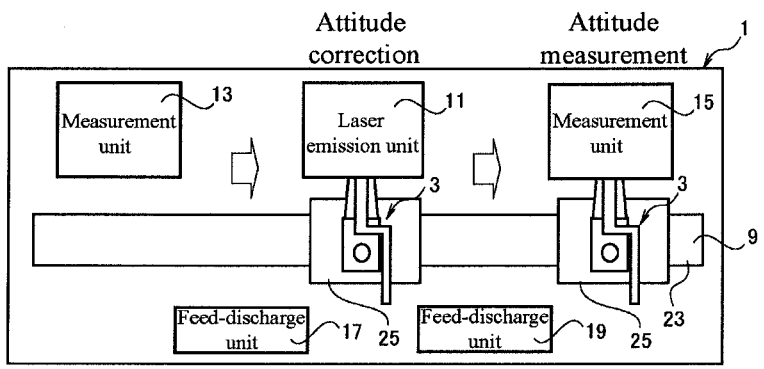

In FIG. 4C, the convey unit 9 is driven in a second direction so that the head suspension 3 in the first zone is positioned at the laser emission unit 11 to carry out attitude correction on the head portion 7 of the head suspension 3.

The attitude correction is carried out as illustrated in FIG. 2. Spots on the head portion 7 that are irradiated with laser beams are on an outrigger 44 of the head portion 7, and therefore, the outrigger 44 is positioned between the laser emitters 27 and 29 of the laser emission unit 11. The image pickup of each marker head 35 picks up an image of the head portion 7 and a periphery thereof. At this time, the laser emitters 27 and 29 are in the standby state, and therefore, the optical axes of laser beams of the laser emitters 27 and 29 are outside the outrigger 44.

According to the measured pitch and roll angles of the head portion 7 and positional data around the head portion 7 obtained from the picked up image, the directivity of the optical axes of laser beams of the laser emitters 27 and 29 are changed from the directivity of the standby state to the direction to the irradiation spots on the outrigger 44 of the head portion 7. The laser emission unit 11 simultaneously emits laser beams from the laser emitters 27 and 29 toward the irradiation spots on the top and bottom sides of the outrigger 44, thereby correcting the attitude of the head portion 7 to a required one.

Laser beams are irradiated so that the irradiation spots on the outrigger 44 of the head portion 7 are continuously adjusted according to, for example, the above-mentioned correction table, and the irradiation is performed, for example, along a predetermined irradiation line. Although the first embodiment simultaneously emits laser beams toward the top and bottom sides of the head suspension 3, it is not necessary to simultaneously emit the laser beams.

When the head suspension 3 in the first zone is at the laser emission unit 11, the head suspension 3 before attitude correction in the second zone is at the measurement unit 15 as illustrated in FIG. 4C. The measurement unit 15 measures pitch and roll angles of the head portion 7 of the head suspension 3.

According to the above-mentioned first embodiment, the attitude correction is carried out in the first zone, and at the same time, the attitude measurement is carried out before attitude correction in the second zone.

Figure 4D:
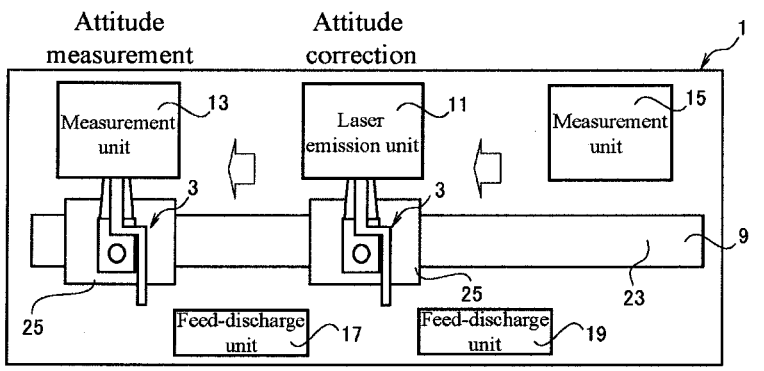

In FIG. 4D, the convey unit 9 is driven in the first direction so that the head suspension 3 after attitude correction in the first zone is positioned at the measurement unit 13 to measure pitch and roll angles of the head portion 7 of the head suspension 3.

At this time, the head suspension 3 before attitude correction in the second zone is positioned at the laser emission unit 11 to carry out attitude correction on the head portion 7 of the head suspension 3. This attitude correction of the head portion 7 is carried out like that on the head suspension 3 in the first zone.

In this way, the attitude measurement of the head portion 7 after attitude correction is carried out in the first zone, and at the same time, the attitude correction is carried out in the second zone.

Thereafter, the convey unit 9 is driven in the second direction via the state of FIG. 4A and to the state of FIG. 4C. In the state of FIG. 4A, the head suspension 3 after attitude correction and measurement in the first zone is taken out from the jig 25 and a new head suspension 3 before attitude correction is fed to the jig 25. If the head suspension 3 in the first zone must further be corrected, the convey unit 9 is driven the first direction to the state of FIG. 4C without taking the state of FIG. 4A.

After feeding the new head suspension 3, the measurement of pitch and roll angles of the head portion 7 in the second zone is carried out in the same manner as that of the first zone.

Thereafter, the convey unit 9 is driven in the first direction via the state of FIG. 4A and to the state of FIG. 4B. In the state of FIG. 4A, the head suspension 3 after attitude correction and measurement in the second zone is taken out from the jig 25 and a new head suspension 3 before attitude correction is fed to the jig 25. If the head suspension 3 in the second zone must further be corrected, the convey unit 9 is driven to the first direction to the state of FIG. 4B without taking the state of FIG. 4A.

The above-mentioned operation is repeated to speedily carryout attitude correction on a plurality of head suspensions 3.

Effect of the first embodiment of the present invention will be explained. The attitude correction apparatus 1 according to the first embodiment includes the laser emission unit 11 that has a pair of the laser emitters 27 and 29. The laser emitters 27 and 29 are arranged to face each other on each side of a correction object (head suspension 3) and emit laser beams to irradiation spots on the head suspension 3, thereby correcting the attitude of the head suspension 3. The laser emitter 27 (29) includes the laser oscillator 41 that generates a laser beam, the condenser lens 39 that emits the laser beam toward the head suspension 3, and the galvanomirrors 37 and 38 that adjust the directivity of the optical axis A of the laser beam from the directivity of a standby state toward an irradiation spot. The condenser lens 39 of the laser emitter 27 (29) is positioned so that the optical axis A of laser beam in the standby state disagrees with the optical path P passing through the condenser lens 39 and laser oscillator 41 of the other laser emitter 29 (27).

This configuration prevents a laser beam emitted from the one laser emitter 27 (or 29), in the standby state in which no attitude correction is carried out, from entering the laser oscillator 41 of the other laser emitter 29 (or 27).

During attitude correction of the head suspension 3, the head suspension 3 is positioned between the laser emitters 27 and 29, and therefore, a laser beam emitted from the laser emitter 27 (29) is prevented from entering into the other laser emitter 29 (27).

As a result, the attitude correction apparatus 1 according to the first embodiment is capable of safely using the pair of laser emitters 27 and 29 facing each other without damaging the optical system of each laser emitter.

According to the first embodiment, the laser emitters 27 and 29 each include the optical isolator 40 in the optical path P between the laser oscillator 41 and the condenser lens 39. The optical isolator 40 blocks a reflected return beam, thereby stabilizing operation of the laser oscillator 41 and preventing the laser oscillator 41 from being damaged by the reflected return beam. The optical isolator 40 is included in the optical system of the laser emitter 27 (29), and therefore, is protected according to the first embodiment from being damaged by a laser beam from the opposing laser emitter 29 (27).

In the standby state, the optical axes A of the laser emitters 27 and 29 extend along the first direction (vertical) and are spaced apart from each other in the second direction that is orthogonal to the first direction. Accordingly, the optical axis A of the laser emitter 27 (29) in the standby state surely deviates from the optical path P passing through the laser oscillator 41 of the other laser emitter 29 (27). This configuration surely prevents the optical system of each of the laser emitters 27 and 29 from being damaged by a laser beam from the opposite laser emitter.

According to the first embodiment, the optical axes A of the laser emitters 27 and 29 are shifted from each other by 10 mm in the second direction. This prevents the optical system of each laser emitter from being damaged by a laser beam from the opposite laser emitter and surely corrects the attitude of the head suspension 3.

The attitude correction apparatus 1 according to the first embodiment emits laser beams toward each side of the head suspension 3, to correct the attitude of the head suspension 3. This configuration speeds up the attitude correction of the head suspension 3, allows an attitude correction amount to be increased, and improves an attitude correction accuracy.

According to the first embodiment, the attitude correction apparatus 1 includes the measurement units 13 and 15 that are arranged on each side of the laser emission unit 11 and measure the attitude of the head suspension 3 before and after the attitude correction. The attitude correction apparatus 1 also includes the convey unit 9 that alternately moves the head suspensions 3 between the measurement units 13, 15 and the laser emission unit 11, so that one of the head suspension 3 is fed from the corresponding measurement unit 13 or 15 to the laser emission unit 11 and the other of the head suspension 3 is retracted from the laser emission unit 11 to the corresponding measurement unit 15 or 13.

On the one hand, the attitude correction apparatus 1 uses the convey unit 9 to move a head suspension 3 from one of the measurement units 13 and 15 to the laser emission unit 11, to correct the attitude of the head suspension 3, and on the other hand, retracts another head suspension 3 from the laser emission unit 11 to the other measurement unit, to measure the attitude of the head suspension 3.

Namely, the attitude correction apparatus 1 according to the first embodiment is capable of correcting the attitude of a first head suspension 3 while measuring the attitude of a second head suspension 3 during this attitude correction time of the first head suspension 3, therefore the necessary time for attitude correction can be shortened.

An attitude correction apparatus according to a second embodiment of the present invention will be explained in detail.

Figure 5:
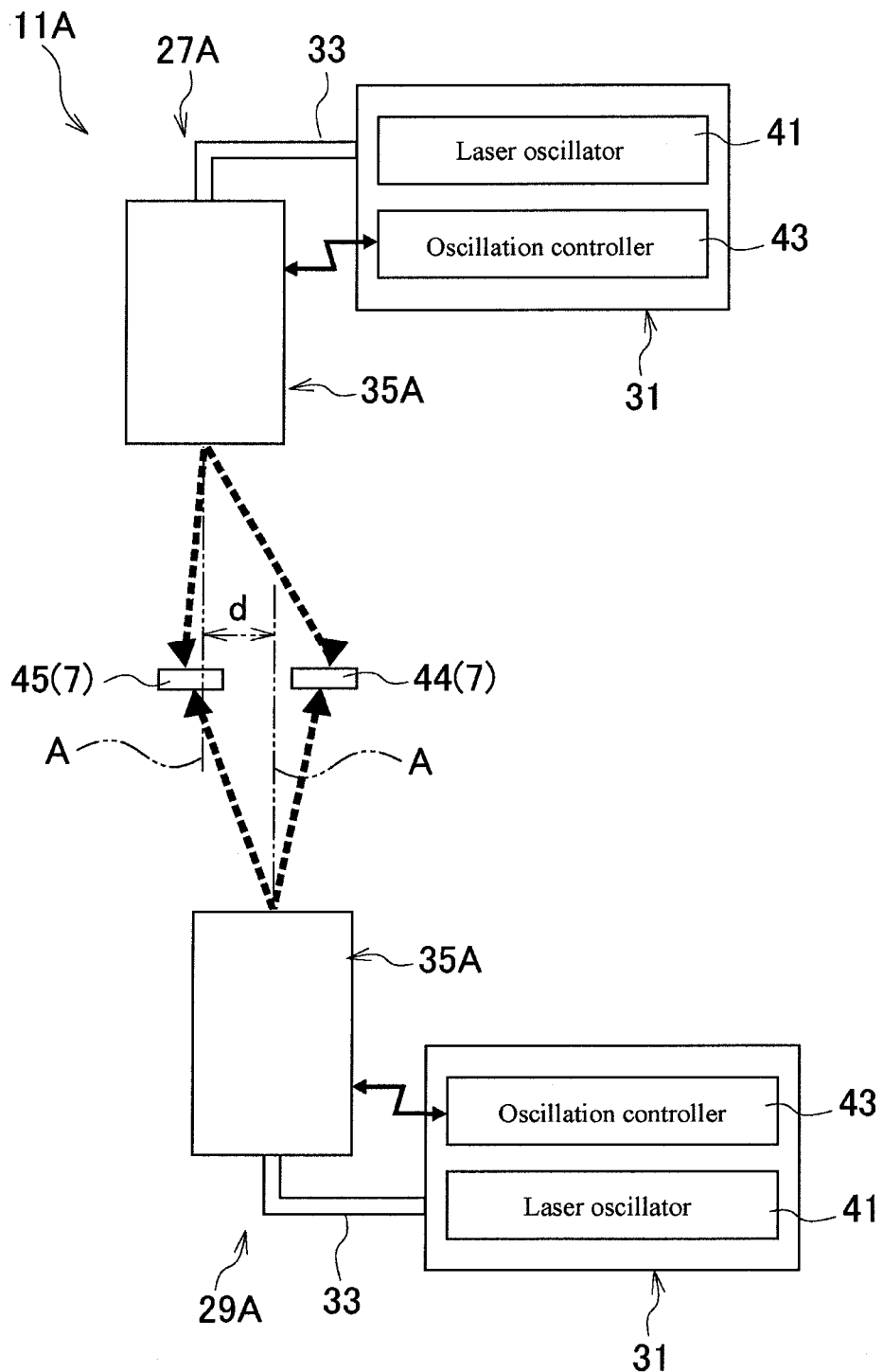
FIG. 5 is a view schematically illustrating a laser emission unit in an attitude correction apparatus according to a second embodiment of the present invention.

FIG. 5 is a view schematically illustrating a laser emission unit in an attitude correction apparatus according to the second embodiment of the present invention. The second embodiment is basically the same as the first embodiment, and therefore, same parts are represented with same reference marks or same reference marks plus "A" to omit overlapping explanation.

According to the second embodiment, as shown in FIG. 5, the laser emission unit 11A includes laser emitters 27A and 29A that emit laser beams to a plurality of irradiation spots on a correction object, i.e., a head suspension 3.

According to the second embodiment, the head suspension 3 has a head portion 7 provided with outriggers 44 and 45 that are spaced apart from each other by a distance of about 8 mm. The laser emitters 27A and 29A emit laser beams to the outriggers 44 and 45.

The outriggers 44 and 45 are positioned within an irradiation range of galvanomirrors 37 and 38 arranged in each of the laser emitters 27A and 29A of the laser emission unit 11A so that the outriggers 44 and 45 are irradiated with laser beams. Namely, irradiation spots on the head suspension 3 are positioned within the irradiation range of the galvanomirrors 37 and 38 and a laser beam reflecting direction of the galvanomirrors 37 and 38 being adjustable within the irradiation range toward the irradiation spots.

The galvanomirrors 37 and 38 operate at high speed, and therefore, are able to substantially simultaneously irradiate the outriggers 44 and 45 with a laser beam, to correct the attitude of the head suspension 3 without extending an operation time.

The second embodiment provides the same effect as the first embodiment.

In addition, the second embodiment nearly simultaneously irradiates the outriggers 44 and 45 with laser beams, to correct the attitude of the head suspension 3. Accordingly, the second embodiment reduces the number of times of movement of the head suspension 3 during attitude correction, thereby shortening an attitude correction time.

An attitude correction apparatus according to a third embodiment of the present invention will be explained in detail.

Figure 6:
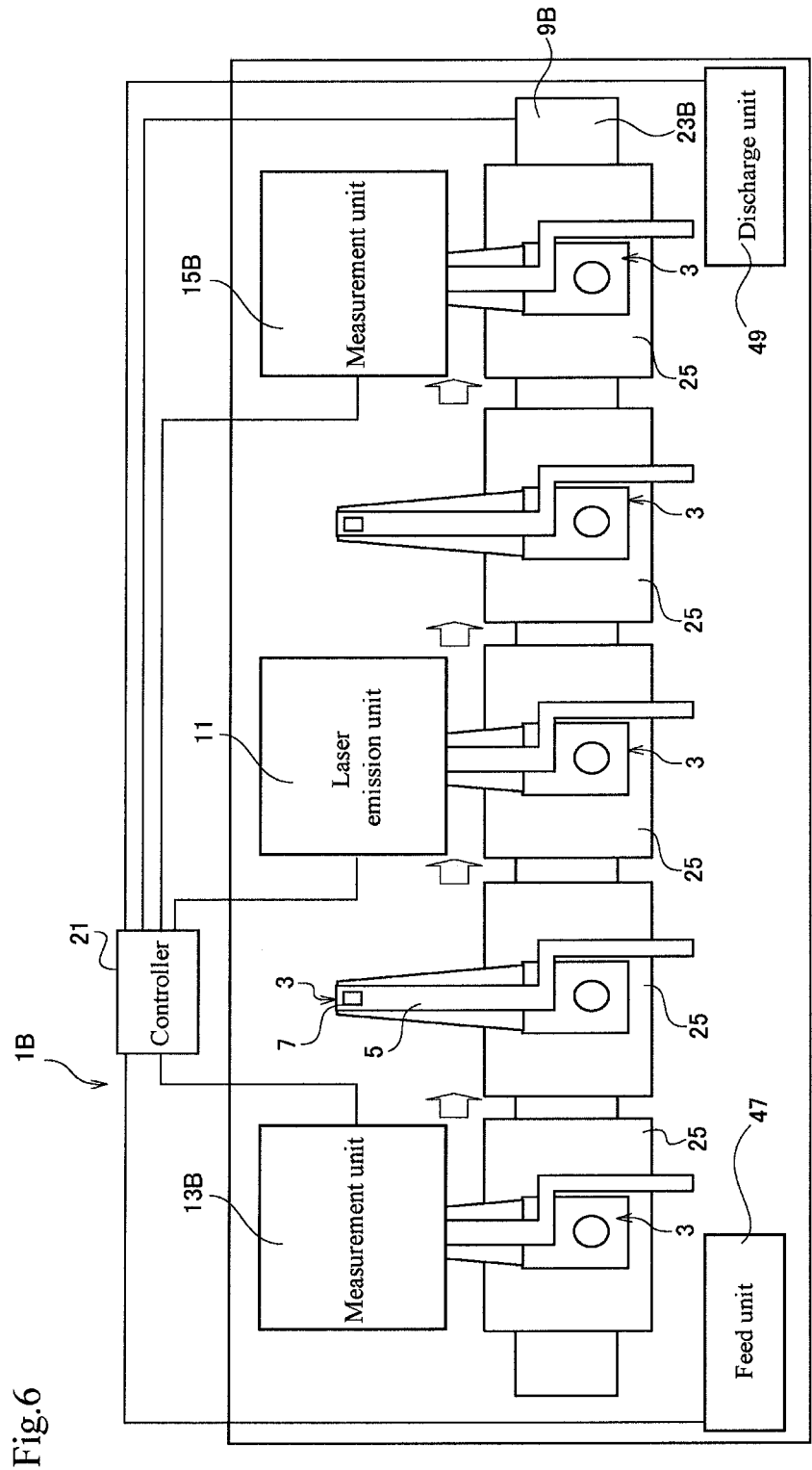
FIG. 6 is a view schematically illustrating an attitude correction apparatus according to a third embodiment of the present invention.

FIG. 6 is a view schematically illustrating an attitude correction apparatus according to the third embodiment of the present invention. The third embodiment is basically the same as the first embodiment, and therefore, same parts are represented with same reference marks or same reference marks plus "B" to omit overlapping explanation.

In FIG. 6, the third embodiment employs a convey unit 9B that operates in one direction between a pair of measurement units 13B and 15B.

Namely, the convey unit 9B conveys a jig 25 supporting a correction object, i.e., a head suspension 3 from the measurement unit 13B through a laser emission unit 11 to the measurement unit 15B.

The measurement unit 13B is on an upstream side (first side) of the laser emission unit 11 and measures attitude angles of the head suspension 3 before attitude correction. The measurement unit 15B is on a downstream side (second side) of the laser emission unit 11 and measures attitude angles of the head suspension 3 after attitude correction.

On an upstream side of the convey unit 9B, there is a feed unit 47 to feed a head suspension 3 before attitude correction to the jig 25. On a downstream side of the convey unit 9B, there is a discharge unit 49 to discharge a head suspension 3 after attitude correction from the jig 25.

The third embodiment provides the same effect as the first embodiment.

In addition, the third embodiment is able to continuously supply head suspensions 3 before attitude correction from the feed unit 47 to the jig 25 and convey the head suspensions 3 with the convey unit 9B, and the attitude measurement before correction, attitude correction, and attitude measurement after correction are successively carried out to the head suspensions 3.

The third embodiment simplifies and speeds up the attitude correction of each correction object (head suspension) and realizes easy control of the attitude correction apparatus 1B.

What is claimed is:

1. An attitude correction apparatus including opposing laser emitters comprising:
   a correction unit having a pair of laser emitters that face each other on each side of a correction object and emit laser beams toward spots on each side of the correction object to correct an attitude of the correction object according to the spots irradiated with the laser beams;
   each of the laser emitters including a light source that generates a laser beam, an emission part that emits the laser beam toward the correction object, and an adjustment part that adjusts a directivity of an optical axis of the laser beam from a directivity in a standby state toward a spot on the correction object; and
   the emission part of each of the laser emitters being positioned so that the optical axis of the laser beam in the standby state disagrees with an optical path that passes through the emission part and light source of the other laser emitter.

2. The attitude correction apparatus of claim 1, wherein the laser emitters are positioned so that the directivity of the optical axes of laser beams in the standby state extend along a first direction and are shifted from each other in a second direction that is orthogonal to the first direction.

3. The attitude correction apparatus of claim 1, wherein the correction object is a head suspension and an amount of the shift between the directivity of the optical axes of laser beams in the second direction is 10 mm.

4. The attitude correction apparatus of claim 1, wherein a plurality of irradiation spots are defined on the correction object within a range into which the adjustment part is able to adjust the laser beam emitted from the emission part.

5. The attitude correction apparatus of claim 1, further comprising:
   an optical isolator arranged between the light source and the emission part in each of the laser emitters and is positioned in the optical path.

6. The attitude correction apparatus of claim 1, wherein the emission part is a condenser lens and the adjustment part is a galvanomirror that reflects the laser beam from the light source toward the condenser lens.

7. The attitude correction apparatus of claim 1, further comprising:
   measurement units arranged on each side of the correction unit and measuring an attitude of the correction object before and after attitude correction; and
   a convey unit that alternately moves correction objects between the measurement units and the correction unit so that one of the correction objects is fed to the correction unit and the other of the correction objects is retracted to corresponding one of the measurement units.

8. The attitude correction apparatus of claim 1, further comprising:
   a pair of measurement units arranged on each side of the correction unit, to measure an attitude of the correction object on a first side of the correction unit before attitude correction and measure an attitude of the correction object on a second side of the correction unit after attitude correction; and
   a convey unit that move the correction object from the measurement unit on the first side of the correction unit, via the correction unit, to the measurement unit on the second side of the correction unit.

* * * * *